US009503010B2

(12) United States Patent
Kim (10) Patent No.: US 9,503,010 B2
(45) Date of Patent: Nov. 22, 2016

(54) APPARATUS AND METHOD FOR MINIMIZING INFLUENCE OF TEMPERATURE CHANGE IN MOTOR

(71) Applicant: HYUNDAI MOBIS CO., LTD., Seoul (KR)

(72) Inventor: Sang-Min Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/681,977

(22) Filed: Apr. 8, 2015

(65) Prior Publication Data

US 2015/0357954 A1 Dec. 10, 2015

(30) Foreign Application Priority Data

Jun. 10, 2014 (KR) ........................ 10-2014-0069921

(51) Int. Cl.
*H02P 21/14* (2016.01)
*B60L 15/20* (2006.01)
*H02P 29/00* (2016.01)

(52) U.S. Cl.
CPC ............ *H02P 21/141* (2013.01); *B60L 15/20* (2013.01); *H02P 21/22* (2016.02); *H02P 29/0044* (2013.01); *H02P 29/0066* (2013.01); *H02P 29/60* (2016.02); *H02P 29/66* (2016.02)

(58) Field of Classification Search
CPC ...... H02P 21/14; H02P 21/141; H02P 21/22; H02P 29/0044; H02P 29/0066
See application file for complete search history.

(56) References Cited

U.S. PATENT DOCUMENTS

| | | | | |
|---|---|---|---|---|
| 5,811,957 A | * | 9/1998 | Bose | ................... H02P 21/0039 318/802 |
| 5,920,161 A | * | 7/1999 | Obara | ................... B60L 3/0023 180/65.225 |
| 7,839,108 B2 | * | 11/2010 | Patel | ................... H02H 7/0852 318/400.01 |

(Continued)

FOREIGN PATENT DOCUMENTS

| | | |
|---|---|---|
| JP | 3567770 B2 | 9/2004 |
| KR | 10-0921115 B1 | 10/2009 |

(Continued)

OTHER PUBLICATIONS

Y.S. Kim, "Control characteristics of an interior permanent magnet synchronous motor considering temperature effects," A Master's thesis of Dept. of Computer Science & Electrical Engineering of Seoul National University, 2007, pp. 41-70.

*Primary Examiner* — Shawki S Ismail
*Assistant Examiner* — Muhammad S Islam
(74) *Attorney, Agent, or Firm* — Knobbe Martens Olson & Bear LLP (57) ABSTRACT

An apparatus for minimizing an influence of a temperature change may include a motor, a temperature sensor for sensing a temperature of the motor to create the temperature information, a command compensation unit compensating a torque command or a magnetic flux demand according to the information on the sensed temperature to create a compensation torque command value or a compensation magnetic flux command value, and an inverter for driving the motor according to a D-axis voltage command value and a Q-axis voltage command value are created according to a D-axis current command value and a Q-axis current command value which are matched with the compensation torque command value or the compensation magnetic flux command value.

17 Claims, 4 Drawing Sheets

(56) References Cited

U.S. PATENT DOCUMENTS

| | | | |
|---|---|---|---|
| 2003/0076065 A1* | 4/2003 | Shafer | B62D 5/0496 318/567 |
| 2004/0007997 A1 | 1/2004 | Fu | |
| 2011/0050141 A1* | 3/2011 | Yeh | H02P 6/08 318/434 |
| 2014/0132200 A1* | 5/2014 | Yoo | H02P 21/14 318/798 |
| 2014/0354204 A1* | 12/2014 | Tachibana | H02P 6/08 318/473 |

FOREIGN PATENT DOCUMENTS

| | | |
|---|---|---|
| KR | 10-0957330 B1 | 5/2010 |
| KR | 10-2012-0061670 A | 6/2012 |

\* cited by examiner

APPARATUS AND METHOD FOR MINIMIZING INFLUENCE OF TEMPERATURE CHANGE IN MOTOR

CROSS-REFERENCE(S) TO RELATED APPLICATION(S)

This application claims priority to Korean Patent Application No. 10-2014-0069921 filed on Jun. 10, 2014, which is incorporated herein by reference in its entirety.

BACKGROUND

1. Field

The present disclosure relates to an apparatus and method for minimizing an influence of a temperature change in a motor.

2. Description of Related Art

In general, to cope with an air pollution and an oil depletion crisis, the technologies related to environmentally friendly vehicles utilizing an electric energy as a power of vehicle have been developed.

A hybrid electric vehicle, a plug-in electric vehicle, a fuel cell electric vehicle and an electric vehicle may be examples of the above environmentally friendly vehicles.

A permanent magnet type electric motor has been widely employed for the above environmentally friendly vehicle. The permanent magnet type electric motor utilizes a permanent magnet to generate a driving force. An intensity of magnetization of the permanent magnet can be permanently changed according to an operating environment of the permanent magnet, in particular, a magnitude of a weak field current and an operational temperature of the electric motor.

In this situation, the electric motor cannot generate a desired driving force. Due to the above, in the electric motor employing the electric motor, an accelerating ability and a fuel economy effect are rapidly deteriorated.

SUMMARY

One aspect of the present invention provides an apparatus and a method for minimizing an influence of a temperature change in a motor, which reflect a temperature change in a motor, which uses a permanent magnetic, in a real-time control to increase an efficiency of a motor and a torque accuracy.

In addition, another aspect of the present invention provides an apparatus and method for minimizing an influence of a temperature change in a motor, which utilize only one magnetic flux table to shorten a develop duration and/or to reduce a computation of a processor.

Yet another aspect of the present invention provides an apparatus for minimizing an influence of a temperature change in a motor, which reflects a temperature change in a motor, which uses a permanent magnetic, in a real-time control to increase an efficiency of a motor and a torque accuracy.

The apparatus for minimizing an influence of a temperature change in a motor according to embodiments of the present invention includes a motor; a temperature sensor for sensing a temperature of the motor to create the temperature information; a command compensation unit compensating a torque command or a magnetic flux demand according to the information on the sensed temperature to create a compensation torque command value or a compensation magnetic flux command value; a D-axis current command table for creating a D-axis current command value matched with the compensation torque command value or the compensation magnetic flux command value; a Q-axis current command table for creating a Q-axis current command value which is matched according to a command compensation; a current controller creating a D-axis voltage command value and a Q-axis voltage command value according to the D-axis current command value and the Q-axis current command value; and an inverter for driving the motor according to the D-axis voltage command value and the Q-axis voltage command value.

At this time, the command compensation unit may include first and second retarders for creating a previous D-axis current command value and a previous Q-axis current command value; a second coordinate converter for converting the previous D-axis current command value and the previous Q-axis current command value into a current magnitude command value and a current angle command value; a magnetic flux table for creating a D-axis magnetic flux value matched with the current magnitude command value and the current angle command value; a torque command compensator for reflecting and compensating the previous D-axis current command value and the magnetic flux command value to create a compensation torque command value from the torque command value; and a magnetic flux command compensator for reflecting and compensating the D-axis magnetic flux value to create a compensation magnetic flux command value from the magnetic flux command value.

In addition, the magnetic flux table may be a D-axis magnetic flux table according to a D-axis current magnitude at a certain temperature.

Also, the previous D-axis current command value and the previous Q-axis current command value may be the values in the Cartesian coordinate system, and the current magnitude command value and the current angle command value may be the values in the angular coordinate system.

Furthermore, the command compensation unit may perform a compensation if a change of the torque command value is less than a specific value predetermined in advance and may do not perform a compensation if a change of the torque command value is greater than the specific value.

Also, the magnetic flux table may have a coil temperature of a stator, which is similar to a rotor temperature.

In addition, the apparatus for minimizing an influence of a temperature change in the motor may further include a rotor temperature estimator for calculating the rotor temperature.

At this time, the rotor temperature estimator may estimate the rotor temperature utilizing D-axis and Q-axis current measurement values, the D-axis and Q-axis voltage command values, the temperature information and an angular velocity of the rotor.

In addition, the temperature sensor may sense a temperature of the stator of the motor.

The apparatus for minimizing an influence of a temperature change in the motor may further include a current sensor for sensing the three-phase current; a first coordinate converter for converting the measured three-phase current into the D-axis and Q-axis current measurement values; and a position/velocity sensor for sensing an angular velocity of the rotor.

At this time, the motor is an interior permanent magnet motor, and a permanent magnet of the interior permanent magnet motor may be a rare earth magnet.

In addition, the inverter may be a PWM inverter employing a pulse wide modulation (PWM) method.

Also, the magnetic flux table may be created by using a stator resistance table created according to the stator temperature and the D-axis magnetic flux table according to the magnitude of the D-axis current created by using the stator resistance table.

On the other hand, one embodiment of the present invention provides a method for minimizing an influence of a temperature change in a motor, includes a temperature information creation step for sensing a temperature of the motor and creating the temperature information of the motor; a command compensation step for compensating a torque command or a magnetic flux demand according to the information on the sensed temperature to create a compensation torque command value or a compensation magnetic flux command value; a current command value step for creating a D-axis current command value, which is matched with the compensation torque command value or the compensation magnetic flux command value, by using a D-axis current command table and for creating a Q-axis current command value, which is matched according to a command compensation, by using a Q-axis current command table; a voltage command value creating step for creating a D-axis voltage command value and a Q-axis voltage command value according to the D-axis current command value and the Q-axis current command value; and a motor driving step for driving the motor according to the D-axis voltage command value and the Q-axis voltage command value.

At this time, the command compensation step may include the steps of comparing a change of the torque command value to a specific value predetermined in advance; performing a compensation process if the change of the torque command value is less than the specific value as a comparison result; and skipping the compensation process if the change of the torque command value is greater than the specific value as a comparison result.

In addition, the step of performing a compensation process if the change of the torque command value is less than the specific value, may further include the steps of creating a previous D-axis current command value and a previous Q-axis current command value; converting the previous D-axis current command value and the previous Q-axis current command value into a current magnitude command value and a current angle command value; creating a D-axis magnetic flux value, which is matched with the current magnitude command value and the current angle command value, by using a magnetic flux table; reflecting and compensating the previous D-axis current command value and the magnetic flux command value to create a compensation torque command value from the torque command value; and reflecting and compensating the D-axis magnetic flux value to create a compensation magnetic flux command value from the magnetic flux command value.

At this time, the magnetic flux table may be created by the step of creating a stator resistance table according to a temperature of a stator and the step of making a D-axis magnetic flux table according to the D-axis current magnitude using the stator resistance table.

A further aspect of the invention provides minimizing influence of temperature changes of an electric motor while the motor is operating. An apparatus for minimizing influence of temperature changes of a motor, comprising; a temperature sensor for detecting a temperature of the motor; a command compensation module for compensating a torque command or a magnetic flux demand according to the detected temperature to create a compensation torque command value; a D-axis current command table for creating a D-axis current command value matching with the compensation torque command value; a Q-axis current command table for creating a Q-axis current command value matching with a command compensation; a current controller for creating a D-axis voltage command value and a Q-axis voltage command value according to the D-axis current command value and the Q-axis current command value; and an inverter for driving the motor according to the D-axis voltage command value and the Q-axis voltage command value.

DESCRIPTION OF EMBODIMENTS

Embodiments are illustrated in the drawings and are described in detail in the present specification. However, it should be understood that the present invention are not limited to specific disclosed embodiments, but include all modifications, equivalents and substitutes encompassed within the spirit and technical scope of the present invention.

In the drawings, the similar structural components are indicated by the similar reference numerals.

The terms including the ordinal numeral such as "first", "second", etc. may be used to describe various components, but the components are not limited by such terms. The terms are used only for the purpose of distinguishing one component from other components.

For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

Unless otherwise specified, all of the terms which are used herein, including the technical or scientific terms, have the same meanings as those that are generally understood by a person having ordinary knowledge in the art to which the present invention pertains.

The terms defined in a generally used dictionary must be understood to have meanings identical to those used in the context of a related art, and are not to be construed to have ideal or excessively formal meanings unless they are obviously specified in the present specification.

In an example of controlling a motor, a method includes measuring a temperature of a motor to create a motor temperature measurement value and adjusting a magnetic flux magnitude and a torque of the motor through three (3) magnetic flux tables prepared for high temperature/medium temperature/low temperature matched with the motor temperature measurement value.

However, the above method may be disadvantageous in that since experiments are be performed for obtaining the magnetic flux tables for three (3) temperatures, excessive development schedule is required.

In order to create a DQ-axis current command value in response to a torque command and a magnetic flux command at a specific temperature, in the above method, two adjacent magnetic flux tables are computed and its output is interpolatively computed. Therefore, the excessive computation of a microprocessor may be required.

Hereinafter, an apparatus and a method for minimizing an influence of a temperature change in a motor according to one embodiment of the present invention are illustrated with reference to the accompanying drawings.

Figure 1:
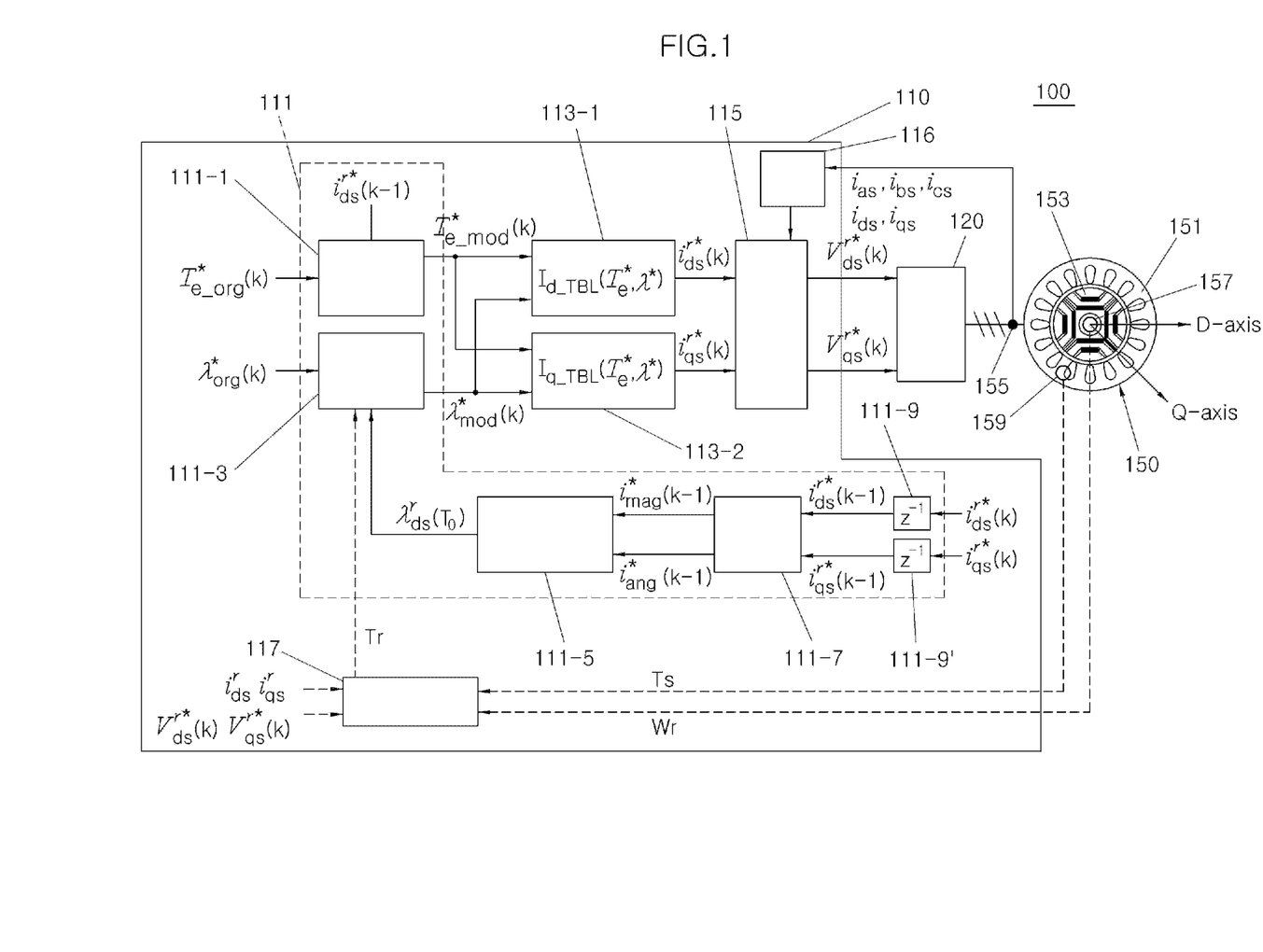
FIG. 1 is a block diagram of an apparatus for minimizing an influence of a temperature change in a motor according to one embodiment of the present invention.

FIG. 1 is a block diagram of an apparatus 100 for minimizing an influence of a temperature change in a motor according to one embodiment of the present invention. First of all, referring to FIG. 1, a motor 150 is described. The motor 150 is a 3-phase alternating current motor, and consists of a stator 151 around which a coil is wound and a rotor 153. For an understanding of the present invention, the 3-phase AC inductor motor is illustrated in the one embodiment of the present invention. However, the present invention is not limited thereto and may be applied to a single-phase motor. In addition, an interior permanent magnet motor may be employed as the motor 150. However, the present invention is not limited thereto, and a universal motor can be used as the motor.

A current sensor 155 is provided on the stator of the above motor for sensing a current of the stator 151 of the motor and providing 3-phase current values $i_{as}$, $i_{bs}$ and $i_{cs}$ to the current controller 115. This current sensor 155 becomes a stator current sensor of the motor in the motor.

Of course, the current sensor may consist of a first stator current sensor and a second stator current sensor.

The 3-phase current values $i_{as}$, $i_{bs}$ and $i_{cs}$ are converted into DQ-axis current measurement values $i_{ds}^r$, $i_{qs}^r$ by a first coordinate converter 116 and are then provided to the current controller 115 and a rotor temperature estimator 117.

The rotor temperature estimator 117 calculates a rotor temperature $T_r$. More concretely, the rotor temperature estimator 117 measures the rotor temperature $T_r$ using D-axis and Q-axis current measurement values $i_{ds}^r$, $i_{qs}^r$ created by the first coordinate converter 116, D-axis and Q-axis voltage command values $v_{ds}^{r*}(k)$, $v_{qs}^{r*}(k)$ created by the current controller 115, a stator coil temperature $T_s$ which is the temperature information created by a temperature sensor 159 and an angular velocity $W_r$ of the rotor created by a position/velocity sensor 157, and supplies this rotor temperature to a command compensation unit 111.

In addition, the motor consists of the temperature sensor 159 for sensing the temperature of the motor 150 and the position/velocity sensor 157 for sensing a locating/velocity of the rotor 153 of the motor.

In particular, the temperature sensor 159 senses the coil temperature of the stator 151 of the motor and creates the temperature information.

In addition, an inverter 120 is provided for supplying alternating current power to the motor 150.

A motor control unit 110 for controlling the above motor 150 includes the command compensation unit 111 compensating a torque command value $T^*_{e_{org}}(k)$ and/or a magnetic flux command value $\lambda^*_{org}(k)$ according to the temperature to create a compensation torque command value $T^*_{e\_mod}(k)$ and/or a compensation magnetic flux command value $\lambda^*_{mod}(k)$ a D-axis current command table 113-1 ($T_{d\_TBL}(T^*_e, \lambda^*)$) creating a D-axis current command value $i_{ds}^{r*}(k)$ to be matched according to the compensation torque command value $T^*_{e\_mod}(k)$ and/or the compensation magnetic flux command value $\lambda^*_{mod}(k)$; a Q-axis current command table 113-2 ($T_{q\_TBL}(T^*_e, \lambda^*)$) creating a Q-axis current command value $i_{qs}^{r*}(k)$ to be matched according to a command compensation; the current controller 115 creating the D-axis voltage command value $v_{ds}^{r*}(k)$ and the Q-axis voltage command value $v_{qs}^{r*}(k)$ according to the D-axis current command value $i_{ds}^{r*}(k)$ and the Q-axis current command value $i_{qs}^{r*}(k)$, and the inverter 120 supplying the power to the motor 150 according to the D-axis voltage command value $v_{ds}^{r*}(k)$ and the Q-axis voltage command value $v_{qs}^{r*}(k)$.

More concretely, the motor control unit 110 is connected to the motor 150 via the inverter 120 to transmit/receive the control signal and/or the sensing signal.

The current controller 115 converts the D/Q-axis current commands into the D/Q-axis voltage command values for the D/Q axes of the stator of the motor and outputs these command values.

The inverter 120 supplies the power to the motor 150 according to the D/Q-axis voltage command values determined and applied in the current controller 115. In other words, the inverter 120 receives the D/Q-axis voltage command values and supplies the power, which corresponds to D/Q-axis voltage command values, to the motor 150.

As the inverter 120, a PWM (pulse width modulation) inverter which is a voltage source inverter is utilized. However, the present invention is not limited thereto, and a current source inverter can be employed if some of structural components are modified.

In the PWM inverter, the direct rectified voltage is controlled with a voltage and a frequency through PWM method.

Therefore, the inverter 120 consists of a plurality of power switching devices. An insulated gate transistor is mainly employed as the power switching device. However, the present invention is not limited thereto, and a bipolar device, a power MOSFET (metal oxide silicon field effect transistor) device may be employed as the power switching device. The power MOSFET device is actuated with a high voltage and a high current, and, unlike an ordinary MOSFET device, has a DMOS (double-diffused metal oxide semiconductor) structure.

The command compensation unit 111 includes first and second retarders 111-9 and 111-9' creating a previous D-axis current command value $i_{ds}^{r*}(k-1)$ and a previous Q-axis current command value $i_{qs}^{r*}(k-1)$ which precede the D-axis current command value $i_{ds}^{r*}(k)$ and the Q-axis current command value $i_{qs}^{r*}(k)$; a second coordinate converter 111-7 converting the previous D-axis current command value and the previous Q-axis current command value, which are the values in the Cartesian coordinate system, into a current magnitude command value $i_{mag}^{r*}(k-1)$ and a current angle command value $i_{ang}^{r*}(k-1)$, which are the values in the angular coordinate system, respectively; a magnetic flux table 111-5 creating a D-axis magnetic flux value $\lambda^*_{ds}(T_0)$ matched with the current magnitude command value and the current angle command value; a magnetic flux command compensator 111-3 reflecting the D-axis magnetic flux value to create a compensation magnetic flux command value $\lambda^*_{mod}(k)$ from the magnetic flux command value $\lambda^*_{org}(k)$; and a torque command compensator 111-1 reflecting the previous D-axis current command value $i_{ds}^{r*}(k-1)$ to create compensation torque command value $T^*_{e\_mod}(k)$ from the torque command value $T^*_{e_{org}}(k)$.

In particular, the magnetic flux table 111-5 becomes a D-axis magnetic flux table according to a D-axis current magnitude at a certain temperature $T_0$.

Figure 2:
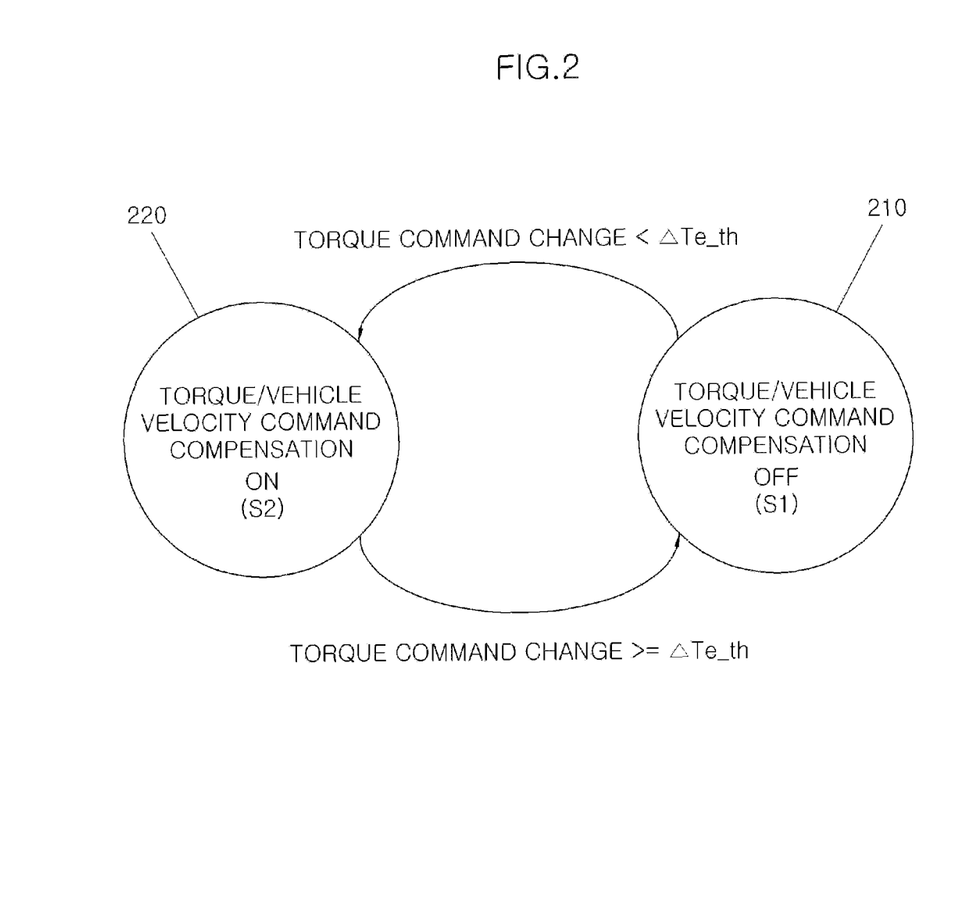
FIG. 2 is a view showing an operation state of a torque/magnetic flux command compensation function according to one embodiment of the present invention.

FIG. 2 is a view showing an operation state of the torque/magnetic flux command compensation function according to one embodiment of the present invention. Referring to FIG. 2, a torque/magnetic flux command compensation OFF 210 means that the torque/magnetic flux command compensation function is in an OFF state.

More concretely, if a change of the torque command value is greater than the limit value $\Delta Te\_th$, the command compensation is not performed.

A torque/magnetic flux command compensation ON 220 means that the torque/magnetic flux command compensation function is in an ON state. More concretely, if a change of the torque command value is less than the limit value $\Delta Te\_th$, the command compensation is performed.

Figure 3:
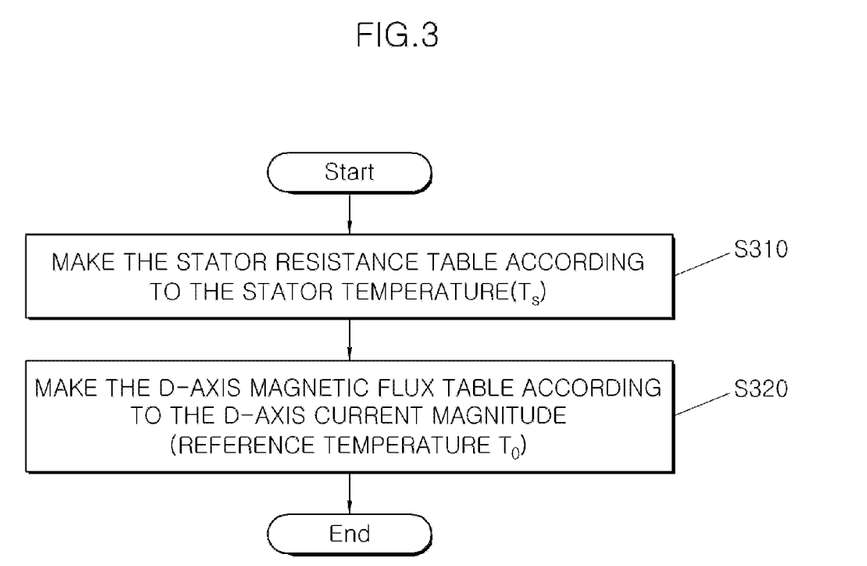
FIG. 3 is a flow chart showing a process of making a table according to one embodiment of the present invention.

FIG. 3 is a flow chart showing a process of making the table according to one embodiment of the present invention. Referring to FIG. 3, a stator resistance table $Rs(T_r)$ according to a temperature of the stator 151 of the motor is made (Step S310).

Figure 4:
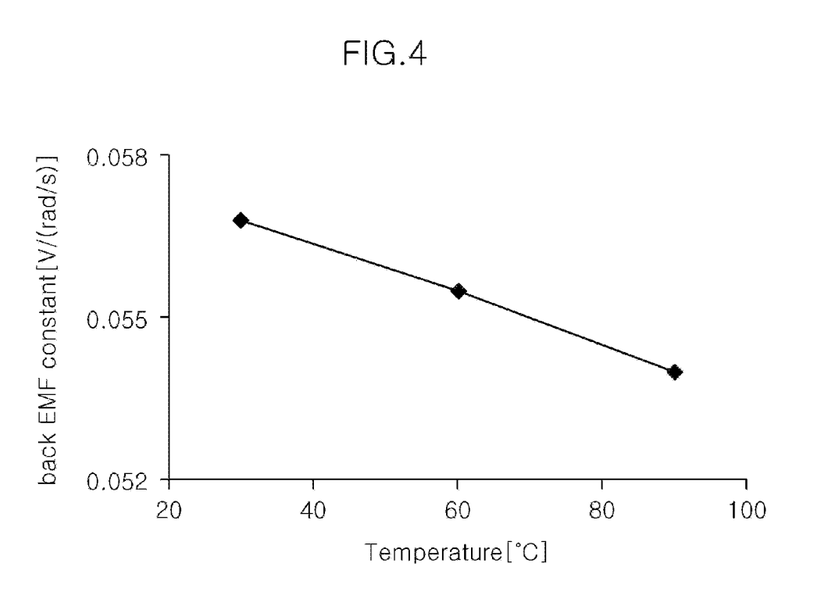
FIG. 4 is a graph showing a back electromotive force characteristic of a permanent motor employing a rare earth magnet.

The permanent magnet motor employing a rare earth magnet has the characteristic that causes a back electromotive force thereof to be reduced according to an increase of the temperature. This characteristic is shown in FIG. 4. FIG. 4 is a graph showing a relation between the temperature and the back electromotive force (EMF) constant of the motor according to one embodiment of the present invention.

A relation between the temperature and the back electromotive force shown in FIG. 4 is obtained by an offline experiment and is then made into an equation and/or a table, and the equation and/or the table(s) are/is utilized. In E=function($T_r$), for example, E($T_r$) may become $\lambda_{PM}(T_r)$. Here, $\lambda_{PM}$ indicates the magnetic flux of the permanent magnet.

Referring to FIG. 3 again, once a making of the stator resistance table $Rs(T_r)$ is completed, a D-axis magnetic flux table (reference temperature:T0) according to the D-axis current magnitude is made (Step S320).

A D-axis and a Q-axis are one-axis of the rotor 153 of the motor. In addition to the above, a Q-axis voltage equation is expressed by the equation as below.

$$V_{qs}^r = R_s i_{qs}^r - \lambda_{ds}^r \omega_r \qquad \text{Equation 1}$$

Here, $R_s$ indicates a stator resistance of the motor, $i_{qs}$ indicates the Q-axis current measurement value (or command value), $\lambda_{ds}$ indicates the D-axis magnetic flux value, and $\omega_r$ indicates an angular velocity of the rotor of the motor.

By using the equation 1, the D magnetic flux can be expressed as the functions of the Q-axis voltage command value, the Q-axis current, an angular velocity of the rotor and a resistance of the stator coil, as shown in below equation.

$$\lambda_{ds}^r(T_r) = \frac{V_{qs}^r(T_s, T_r) - R_s(T_s) i_{qs}^r}{\omega_r} \qquad \text{Equation 2}$$

$$i_{qs}^r = i_{mag} \sin(i_{ang}) \qquad \text{Equation 3}$$

Here, $R_s(T_s)$ indicates the stator resistance value which is changed according to a temperature of the coil.

The stator resistance $R_s$ is changed according to the temperature $T_s$ of the stator coil, and under the assumption that the angular velocity of the rotor and the Q-axis stator current are remained constant, the Q-axis current command value is the value which is changed according to the temperature $T_s$ of the stator coil and the temperature $T_r$ of the rotor magnet.

In addition, "$i_{mag}$" indicates a magnitude of the current and "$i_{ang}$" indicates an angle of the current.

When the offline experiment for making the magnetic flux table is performed, the current-magnetic flux table utilizes the above equation 3. When the offline experiment is performed, $T_s$ is equal to $T_r$. In other words, the temperature of the stator coil is similar to the temperature of the rotor coil. Here, the back electromotive force is the function of the temperature $T_r$ of the rotor magnet.

The "current-magnetic flux table" made by using the above equation at the rotor temperature $T_{r0}$ may be utilized together with below equation. The below equation is an equation for calculating the D-axis magnetic flux (D-axis magnetic flux at the rotor temperature $T_{r0}$) from a magnitude of the current and the angle command which are in the preceding cycle (k−1).

$$\lambda_{ds}^r(T_{r0}) = \Lambda_{d\_TBL}(i^*_{mag}(k-1), i^*_{ang}(k-1))|_{T_{r0}} \qquad \text{Equation 4}$$

A relation among the DQ-axis current, the current magnitude $i_{mag}$ and the current angle $i_{ang}$ in the above equation is expressed by the below equation.

$$i^*_{mag}(k-1) = \sqrt{i^{*2}_{ds}(k-1) + i^{*2}_{qs}(k-1)} \qquad \text{Equation 5}$$

$$i^*_{ang}(k-1) = \tan^{-1}\left(\frac{i^*_{qs}(k-1)}{i^*_{ds}(k-1)}\right) \qquad \text{Equation 6}$$

Figure 5:
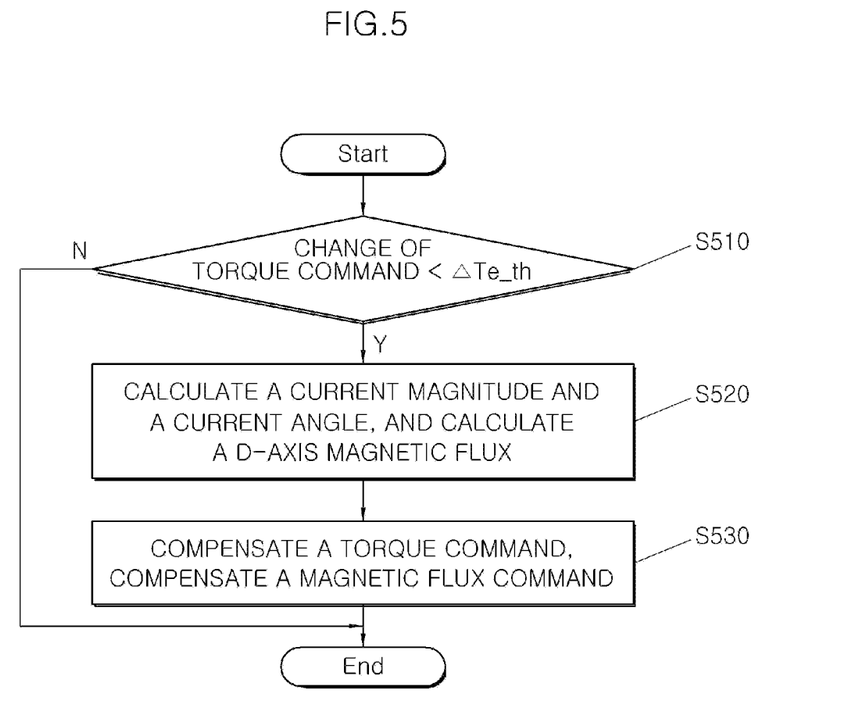
FIG. 5 is a flow chart showing a torque/magnetic flux command compensation process according to one embodiment of the present invention.

FIG. 5 is a flow chart showing a torque/magnetic flux command compensation process according to one embodiment of the present invention. Referring to FIG. 5, it is ascertained whether a change of the torque command value is less than the limit value $\Delta Te\_th$ (Step S510).

As the ascertainment result, if a change of the torque command value is greater less than the limit value $\Delta Te\_th$ in the step S510, the compensation process is not performed.

Unlike the above, if a change of the torque command value is less than the limit value $\Delta Te\_th$ in the step S510, the compensation process is performed.

In other words, the current magnitude and the current angle command value are calculated and the D-axis magnetic flus value is calculated (Step S520). By using the equations 5 and 6, in other words, the current magnitude and/or the current angle command value are/is calculated in real-time from the DQ-axis current command value.

By using the equation 4, subsequently, the D-axis magnetic flux value (D-axis magnetic flux at the rotor temperature $T_{r0}$) for the current magnitude and the current angle command value are calculated.

Once the D-axis magnetic flux value is calculated, the torque command value is compensated by using the below equation (Step S520).

$$T^*_{e\_mod}(k) = T^*_{e\_org}(k) + \frac{3}{2}\frac{P}{2}\Delta\lambda_{PM}(T)i^*_{qs}(k-1) \qquad \text{Equation 7}$$

At this time, the torque command value is compensated by using the previous Q-axis current command value $i^*_{qs}(k-1)$, which is the value in the preceding cycle" and a difference $\Delta\lambda_{PM}(T_r)$ between the back electromotive force constant at the rotor temperature $T_r$ and the back electromotive force constant at the reference temperature $T_{r0}$.

$\Delta\lambda_{PM}(T_r)$ indicates a difference between the back electromotive force constants and is defined as the below equation.

$$\Delta\lambda_{PM}(T_r) = \lambda_{PM}(T_{r0}) - \lambda_{PM}(T_r)$$  Equation 8

At the same time, the magnetic flux command value is compensated through the above equation in the step S530. At this time, the magnetic flux command value is compensated by using the difference $\Delta\lambda_{PM}(T_r)$ between the back electromotive force constant at the rotor temperature $T_r$ and the back electromotive force constant at the reference temperature $T_{r0}$ and the D-axis magnetic flux value (D-axis magnetic flux at the rotor temperature $T_r$) obtained from the equation 4. This may be expressed by the below equation.

$$\lambda^*_{mod} = \sqrt{[\lambda^*_{org}(k)]^2 + \Delta\lambda_{PM}(T_r) \cdot [\Delta\lambda_{PM}(T_r) + 2\lambda^r_{ds}(T_{r0})]}$$  Equation 9

According to embodiments of the present invention, a temperature change in the motor is reflected in a real-time control to increase an efficiency of the motor and to enhance the torque accuracy.

Also, in embodiments of the present invention, since only one magnetic flux table is employed, as compared with a method using three (3) tables provided for separate temperature, a computation time is reduced.

In addition, the present invention is further advantageous in that since only one magnetic flux table is sufficient, the logic development schedule is reduced.

While embodiments of the present invention have been described, it will be apparent to those skilled in the art that various changes and modifications may be made without departing from the spirit and scope of the invention as defined in the following claims.

What is claimed is:

1. A motor apparatus comprising;
   a motor comprising a stator and a rotor;
   a temperature sensor configured to sense the stator's temperature;
   a command compensation unit configured to receive and compensate an input torque command and an input magnetic flux command to provide a compensation torque command value and a compensation magnetic flux command value,
   wherein the compensation torque command value is computed using the input torque command and a back electromotive force value that is computed based on the rotor's temperature estimated from the stator's temperature,
   wherein the compensation flux command value is computed using the input magnetic flux command and the back electromotive force value that is computed based on the rotor's temperature estimated from the stator's temperature;
   a D-axis current command table configured to provide a D-axis current command value corresponding to a set of the compensation torque command value and the compensation magnetic flux command value;
   a Q-axis current command table configured to provide a Q-axis current command value corresponding to the set of the compensation torque command value and the compensation magnetic flux command value;
   a current controller configured to create a D-axis voltage command value and a Q-axis voltage command value based on the D-axis current command value and the Q-axis current command value; and
   an inverter configured to drive the motor according to the D-axis voltage command value and the Q-axis voltage command value.

2. The apparatus of claim 1, wherein the command compensation unit comprises:
   first and second retarders configured to create a previous D-axis current command value and a previous Q-axis current command value;
   a second coordinate converter configured to convert the previous D-axis current command value and the previous Q-axis current command value into a current magnitude command value and a current angle command value;
   a magnetic flux table configured to create a D-axis magnetic flux value matched with the current magnitude command value and the current angle command value;
   a torque command compensator configured to compute the compensation torque command value using from the input torque command and the previous D-axis current command value; and
   a magnetic flux command compensator configured to compute the compensation magnetic flux command value using the input magnetic flux command value and the D-axis magnetic flux value.

3. The apparatus of claim 1, further comprising a rotor temperature estimator configured to calculate the rotor temperature, the rotor temperature estimator configured to estimate the rotor temperature utilizing D-axis and Q-axis current measurement values, the D-axis and Q-axis voltage command values, the stator's temperature and an angular velocity of the rotor.

4. The apparatus of claim 1, furthering comprising;
   a current sensor configured to sense the three-phase current;
   a first coordinate converter configured to convert the measured three-phase current into the D-axis and Q-axis current measurement values; and
   a position/velocity sensor configured to sense an angular velocity of the rotor.

5. The apparatus of claim 1, wherein the stator of the motor comprises a permanent magnet motor formed of a rare earth magnet material.

6. The apparatus of claim 1, wherein the inverter is a PWM inverter employing a pulse wide modulation (PWM) method.

7. The apparatus of claim 1, wherein the compensation torque command value is computed by a torque command compensation formula, wherein the torque command compensation formula is represented as follows:

$$T^*_{e\_mod}(k) = T^*_{e\_org}(k) + \frac{3}{2}\frac{P}{2}\Delta\lambda_{PM}(T)i^*_{qs}(k-1)$$

wherein $T^*_{e\_mod}(k)$ is the compensation torque command value, $T^*_{e\_org}(k)$ is the input torque command, $i^*_{qs}(k-1)$ is a previous Q-axis current command value, and $\Delta\lambda_{PM}(T)$ is difference between the back electromotive force value at the temperature of the rotor's estimated temperature $T_r$ and the back electromotive force value at the rotor's reference temperature of the rotor $T_{r0}$,
wherein the magnetic flux command compensation formula is represented as follows:

$$\lambda^*_{mod} = \sqrt{[\lambda^*_{org}(k)]^2 + \Delta\lambda_{PM}(T_r) \cdot [\Delta\lambda_{PM}(T_r) + 2\lambda^r_{ds}(T_{r0})]}$$

wherein $\lambda^*_{mod}$ is the compensation flux command value, $\lambda^*_{org}(k)$ is the input magnetic flux command, $\Delta\lambda_{PM}(T)$ is difference between the back electromotive force value at the rotor's estimated $T_r$ and the back electromotive force value at the rotor's reference temperature $T_{r0}$ and $\lambda_{ds}^{r}(T_{r0})$ is the D-axis magnetic flux value at the rotor's reference temperature $T_{r0}$.

8. The apparatus of claim 2, wherein the magnetic flux table is a D-axis magnetic flux table according to a D-axis current magnitude at a certain temperature.

9. The apparatus of claim 2, wherein the previous D-axis current command value and the previous Q-axis current command value are the values in the Cartesian coordinate system, and the current magnitude command value and the current angle command value are the values in the angular coordinate system.

10. The apparatus of claim 2, wherein the command compensation unit configured to perform a compensation if a change of the torque command value is less than a specific value predetermined in advance and does not perform a compensation if a change of the torque command value is greater than the specific value.

11. The apparatus of claim 8, wherein the magnetic flux table is created by using a stator resistance table created according to the stator temperature and the D-axis magnetic flux table according to the magnitude of the D-axis current created by using the stator resistance table.

12. A method of operating a motor comprising a stator and a rotor, the method comprising;
sensing a temperature of the stator;
receiving and processing an input torque command and an input magnetic flux command to provide a compensation torque command value and a compensation magnetic flux command value, wherein the compensation torque command value is computed using the input torque command and a back electromotive force value that is computed based on the rotor's temperature estimated from the stator's temperature, wherein the compensation flux command value is computed using the input magnetic flux command and the back electromotive force value that is computed based on the rotor's temperature estimated from the stator's temperature;
obtaining a D-axis current command value with reference to D-axis current command table using a set of the compensation torque command value and the compensation magnetic flux command value;
obtaining a Q-axis current command value with reference to a Q-axis current command table using the set of the compensation torque command value and the compensation magnetic flux command value;
generating a D-axis voltage command value and a Q-axis voltage command value based on the D-axis current command value and the Q-axis current command value; and
driving the motor using the D-axis voltage command value and the Q-axis voltage command value.

13. The method of claim 12, wherein processing comprises;
determining if a change of the torque command value to a specific value predetermined;
wherein the compensation torque command value and the compensation flux command value are computed when determined that the change of the torque command value is less than the specific value; and
wherein the compensation torque command value and the compensation flux command value are not computed when determined that the change of the torque command value is greater than the specific value.

14. The method of claim 12, wherein the compensation torque command value is computed by a torque command compensation formula, wherein the torque command compensation formula is represented as follows:

$$T^*_{e\_mod}(k) = T^*_{e\_org}(k) + \frac{3}{2}\frac{P}{2}\Delta\lambda_{PM}(T)i^*_{qs}(k-1)$$

wherein $T^*_{e\_mod}(k)$ is the compensation torque command value, $T^*_{e\_org}(k)$ is the input torque command, $i^*_{qs}(k-1)$ is a previous Q-axis current command value, and $\Delta\lambda_{PM}(T)$ is the difference between the back electromotive force value at the temperature of the rotor's estimated temperature $T_r$ and the back electromotive force value at the rotor's reference temperature of the rotor $T_{r0}$, wherein the magnetic flux command compensation formula is represented as follows:

$$\lambda^*_{mod} = \sqrt{[\lambda^*_{org}(k)]^2 + \Delta\lambda_{PM}(T_r)\cdot[\Delta\lambda_{PM}(T_r) + 2\lambda^r_{ds}(T_{r0})]}$$

wherein $\lambda^*_{mod}$ is the compensation flux command value, $\lambda_{org}(k)$ is the input magnetic flux command, $\Delta\lambda_{PM}(T)$ is the difference between the back electromotive force value at the rotor's estimated $T_r$ and the back electromotive force value at the rotor's reference temperature $T_{r0}$ and $\lambda_{ds}^{r}(T_{r0})$ is the D-axis magnetic flux value at the rotor's reference temperature $T_{r0}$.

15. The method of claim 13, wherein processing comprises:
creating a previous D-axis current command value and a previous Q-axis current command value;
converting the previous D-axis current command value and the previous Q-axis current command value into a current magnitude command value and a current angle command value; and
creating a D-axis magnetic flux value, which is matched with the current magnitude command value and the current angle command value, by using a magnetic flux table;
wherein the compensation torque command value is computed using the input torque command and the previous D-axis current command value; and
wherein the compensation magnetic flux command value is computed using the input magnetic flux command value and the D-axis magnetic flux value.

16. The method of claim 13, wherein the magnetic flux table is a D-axis magnetic flux table according to a D-axis current magnitude at a certain temperature.

17. The method of claim 16, wherein the magnetic flux table is created by creating a stator resistance table according to a temperature of a stator and making a D-axis magnetic flux table according to the D-axis current magnitude using the stator resistance table.

* * * * *